United States Patent Office 2,778,786
Patented Jan. 22, 1957

2,778,786

COATING A CARBONACEOUS SURFACE WITH RHENIUM

Harry Pearlman, Whittier, Louis Silverman, Los Angeles, and Curtiss A. Smith, Whittier, Calif., assignors, by mesne assignments, to the United States of America as represented by the United States Atomic Energy Commission No Drawing. Application November 17, 1953, Serial No. 392,754

10 Claims. (Cl. 204—37)

This invention relates to coatings on carbon and particularly to a process for coating a carbonaceous surface with rhenium.

Carbon, particularly the graphite form of carbon, possesses physical properties which make it a desirable raw material from which to construct structural elements which are to be subjected to very high temperatures during normal operations. For example, graphite attains its maximum tensile strength when heated to about 2500° C. Its dimensional stability is also satisfactory at these very high temperatures. However, graphite possesses certain structural disadvantages which materially limit its utility as a high operating temperature material. These disadvantages include brittleness, a high porosity and a poor surface hardness. In order to overcome these disadvantages, this invention contemplates bonding a metallic coating to the surface of the graphite structure. This metallic coating should have a very high melting point, should be easy to apply, and should remain strongly bonded to the graphite surface at the high operating temperatures.

It is contemplated by this invention to coat the surfaces of the graphite structure with rhenium to thereby eliminate the disadvantages above enumerated. Rhenium has a melting point of over 3000° C. When plated by the process hereinafter described, rhenium is easily coated on the graphite surface and remains strongly bonded to the surfaces at temperatures as high as 1000° C. Rhenium-coated graphite maintains its structural strength at high temperatures and is highly resistant to the corrosive effects of liquid metals and of carbonaceous gases. As a structural element in the field of the conveyance of high temperature fluids and in the emitter field, rhenium-coated graphite is vastly superior to the materials which have been used in the past.

Considering first the field of fluid circuits, particularly high temperature fluid circuits for conveying liquid metals or carbonaceous gases, a rhenium inner coating on graphite tubes and other component parts of the circuit improves the operating characteristics of the circuit. As previously pointed out, rhenium is highly corrosive-resistant to the circulating fluids. The natural porosity of graphite, which previously permitted many of the liquids and gases to leak out of the circuit, is counteracted by the impenetrable nature of the rhenium coating. The poor surface hardness of the graphite is eliminated by the covering of the surface with rhenium which has a hard metallic finish.

A second important field in which rhenium-coated graphite has great utility is as an emitter element, particularly in X-ray tubes. An emitter is a wire-like element which is heated to a very high temperature in a vacuum to thereby cause an emission of electrons. In the past, emitters have usually been constructed of tungsten. A disadvantage in the use of tungsten as an emitter material is its volatility at the high operating temperatures. Rhenium has a lower volatility than tungsten at these temperatures and therefore is to be preferred over tungsten. By constructing a wire base for the emitter from graphite and coating the wire with rhenium, an emitter is produced which is structurally strong at the high operating temperatures and which has an increased life due to the slower rate of volatization.

It is therefore an object of this invention to provide an improved high operating temperature element comprising a graphite base coated with rhenium.

It is another object of this invention to provide a process for coating a graphite object with rhenium.

It is a further object of this invention to provide a process for coating rhenium on a graphite surface, comprising electrodepositing rhenium on said surface and baking said surface in a vacuum.

It is a further object of this invention to provide a process for coating a graphite object with rhenium comprising electroplating rhenium on a graphite surface to thereby form a coating of rhenium metal annd heating the coated object in a vacuum to a temperature of at least 1100° C. to thereby strongly bond the rhenium coating to the graphite surface.

Other objects of invention will become apparent from the following description.

Graphite is a pressed carbon which has a noncontinuous microstructure. Thus, graphite bodies are readily penetrated by many liquids and gases. However, because of the inherent stability of graphite under high operating temperatures, objects formed from it have frequently been used in apparatus which must be subjected to extremely high temperatures. The present use of this material for fluid circuits, particularly the conduction of liquid metals, has been greatly limited not only by graphite's porosity but also by its comparatively low corrosion resistance to many of the liquid metals. For these reasons a coating of rhenium on the surface of the graphite elements materially expands the number of operative devices which can be satisfactorily and inexpensively constructed of graphite. Rhenium, with its high melting point and its high corrosion-resistance to liquid metals and to carbonaceous gases makes an excellent lining for the inner surfaces of tubes and other component parts of fluid circuits.

The graphite object to be coated is prepared for electroplating by first removing all loose particles of graphite from the surface by sanding, scraping or dusting. After all the foreign matter and loose particles have been removed, the object is placed in an oven where it is heated for several minutes at from 110° to 130° C. The purpose of this preheating step is to remove all of the moisture and gases from the pores. Upon removal from the oven, the object is ready for the plating process.

There are several electrolytic solutions from which rhenium is electrodeposited onto a graphite surface. One such electrolytic solution is a sulfuric acid solution containing potassium perrhenate with a solution pH of 0.9. The carbon object to be coated is inserted in the bath and connected to a source of D.-C. potential as the cathode or negative electrode. A second pole of platinum or carbon is inserted in the bath and connected to the positive pole of the source as the anode or positive electrode. The greatest precaution must be taken to insure a good electric connection between the electrodes and the connecting wire. This is especially important in view of the comparatively high resistivity of the graphite electrodes. Further, the connecting wires must be masked from the electrolytic bath to prevent the rhenium from preferentially coating the connecting wire rather than the graphite object.

The conditions for plating are a solution temperature of from 25° to 50° C., a voltage between the electrodes of from 5 to 10 volts, and a current density of from 1 to 15 amperes per square centimeter of surface area of the graphite object being coated. The plating, contrary to past experiences in the field of electrodeposition of metals, is made thicker when surface actants of the glycol type, such as Carbitol, are added to the electrolytic bath.

An alternative electrolytic bath, from which rhenium is electroplated on the graphite object, is an acid bath in which the rhenium is held in solution as a complex ion in the presence of citric acid. An example is a 10% potassium perrhenate solution with sufficient citric acid to form a solution with pH 1. The plating from this bath is accelerated and the depth of the plating is increased by using such actants as triethanolamine or sulfurous acid.

After the plating has been completed, the coated object is immediately washed with distilled water to remove most of the electrolytic solution from the coating. It is then dipped in anhydrous methyl alcohol to remove excess moisture. Upon removal from the methyl alcohol bath the coated object is placed at once in an air oven and heated to 110° C. In this air oven the methyl alcohol is evaporated, thereby reducing the load on the vacuum pump of the last, or baking, step. The coated object is not allowed to remain in the air oven for more than a few hours or the rhenium oxidizes. At this stage the rhenium coating is still very porous and therefore exposes a large surface area to an oxidizing atmosphere. If rhenium oxide is allowed to form on this large surface area, the strength of the coating is greatly reduced and a considerable amount of flaking takes place.

After substantially all of the surface moisture has been removed from the coating in the air oven, the coated object is transferred to a high temperature furnace where it is heated to a high temperature in a vacuum. It has been found that the best grain structure is obtained by heating the coating to 2200° C., although temperatures as low as 1100° C. have been found to be satisfactory. Induction heating of the graphite has been used successfully to attain these high temperatures; however, other types of furnaces can be used. This final heating process greatly improves the grain structure of the rhenium plating forming a smooth nonporous coating on the graphite base. It further increases the strength of the rhenium-to-graphite bond. Any residual sulfuric acid, which still remains on the object from the electrolytic bath and which reacts with rhenium, is also removed in this baking step.

For additional thickness of the rhenium coating, the above-described electroplating cycle may be repeated as often as desired. After each period of electrodeposition, the graphite surface is heat treated until a layer of rhenium of the desired thickness is obtained. After the final cooling, the coated graphite object is ready for high temperature operation.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A process for securely bonding a coating of rhenium to a carbonaceous part comprising electroplating said part with rhenium and immediately heating said plated part in a vacuum to at least 1100° C. whereby said rhenium forms a protective coating over said carbonaceous part with good bonding strength at temperatures as high as 1000° C.

2. The process of claim 1 and further comprising electroplating on said plated part a second coating of rhenium, reheating said plated part in a vacuum to at least 1100° C. and repeating said electroplating and said heating steps until the desired thickness of rhenium is coated on said carbonaceous part.

3. A process for plating rhenium on a carbon part comprising passing an electric current through an electrolytic bath containing complex rhenium ions to said carbon part, and subsequently heating said carbon part in a vacuum to at least 1100° C. whereby a rhenium coating is strongly bonded to the surface of said carbon part.

4. A process for plating rhenium on a carbon part comprising cleaning said carbon part; passing an electric current through an electrolytic bath, containing rhenium ions in solution, and into said carbon part; immersing said carbon part in anhydrous methyl alcohol, and heating said carbon part in a vacuum to a temperature of at least 1100° C. whereby a rhenium coating which is structurally strong at high temperatures is strongly bonded to said carbon part.

5. A process for plating rhenium on a carbon part comprising cleaning the carbon part; passing a current through said carbon part at a current density of at least one ampere per square centimeter of surface area while said carbon part is inserted in an electrolytic bath containing complex rhenium ions in solution; washing said plated carbon part with distilled water; immersing said carbon part in anhydrous methyl alcohol; and immediately heating said carbon part in a vacuum to at least 1100° C. whereby said carbon part is coated with rhenium with good bonding strength at temperatures as high as 1000° C.

6. A process for plating rhenium on a carbon part comprising cleaning the carbon part; passing a current through said carbon part while said carbon part is immersed in a sulfuric acid electrolytic bath containing a soluble perrhenate; washing said carbon part with distilled water; immersing said carbon part in anhydrous methyl alcohol; and immediately heating said carbon part in a vacuum to at least 1100° C. whereby a rhenium coating of good grain structure is strongly bonded to the surface of said carbon part.

7. A process as recited in claim 6 in which said electrolytic bath further contains a glycol actant whereby the plating rate and thickness of said rhenium coating is increased.

8. A process for plating rhenium on a carbon part comprising cleaning said carbon part; passing a current through an electrolytic bath to said carbon part, said electrolytic bath comprising an acid bath wherein a complex rhenium ion is held in solution by citric acid; washing said carbon part with distilled water; dipping said carbon part in anhydrous methyl alcohol; and heating said carbon part in a vacuum to at least 1100° C. whereby said rhenium forms a protective coating over said carbon part with good bonding strength at temperatures as high as 1000° C.

9. The method of claim 1, wherein said temperature is approximately 2200° C.

10. The method of claim 6, wherein said temperature is aproximately 2200° C.

References Cited in the file of this patent

UNITED STATES PATENTS

| 2,512,141 | Ma et al. | June 20, 1950 |
| 2,616,840 | Levi | Nov. 4, 1952 |